Nov. 24, 1925.
A. S. JONES
1,562,644
CASING PULLEY
Filed June 1, 1923
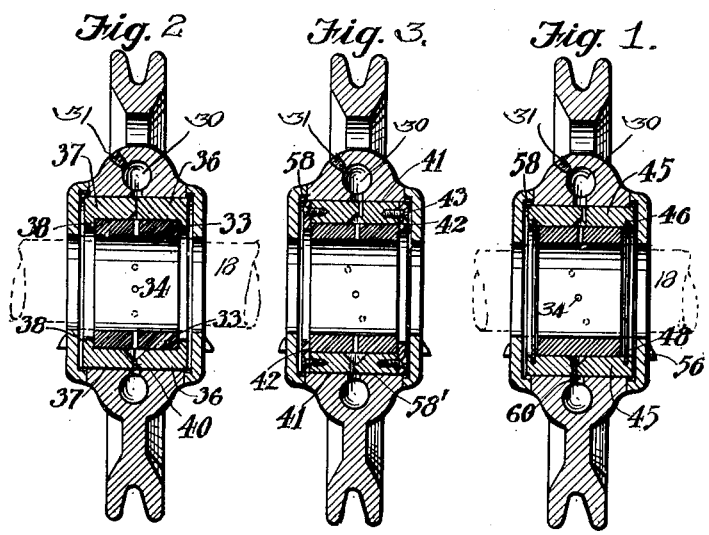
Inventor
Albert S. Jones
By Church & Church
His Attorneys Patented Nov. 24, 1925.

1,562,644

UNITED STATES PATENT OFFICE.

ALBERT S. JONES, OF CHATTANOOGA, TENNESSEE, ASSIGNOR TO LUCEY MANUFACTURING CORPORATION, OF CHATTANOOGA, TENNESSEE, A CORPORATION OF TENNESSEE.

CASING PULLEY.

Application filed June 1, 1923. Serial No. 642,816.

*To all whom it may concern:*

Be it known that I, ALBERT S. JONES, a citizen of the United States, residing at Chattanooga, in the county of Hamilton and State of Tennessee, have invented certain new and useful Improvements in Casing Pulleys; and I do hereby declare the following to be a full, clear, and exact description of the same, reference being had to the accompanying drawings, forming part of this specification.

This invention relates to a casing pulley structure particularly of the type used in crown blocks for well drilling apparatus and has for its object the improvement of such structure. An important feature of the present invention is the provision of a floating bushing on the sheave or pulley in combination with means for effectively positioning the floating pulley with relation to the sheave and the I-beams which support the stationary shaft of the sheaves.

A further object of the present invention lies in the provision of a loosely mounted, non-rotating thrust washer at each side of each pulley to prevent the sheaves from rubbing against the sides of the beams.

The crown block in its general form is quite similar to that described in the Vreeland Patent No. 1,368,775 dated February 15, 1921, and is used for the purpose described in that patent.

In the drawings,—

Fig. 1 is a central section through the preferred form of my device.

Figs. 2 and 3 are similar views of slightly modified forms.

Each sheave has an annular oil chamber 30 closed by a plurality of plugs 31 preferably three or more in number so that one of the plugs will be in such position as to render convenient the filling of the oil chamber 30 irrespective of the position in which the sheave comes to rest.

A bushing of steel is pressed in the sheave usually at from five to seven tons pressure effectively preventing turning of the steel bushing in the sheave pulley and also preventing oil from leaking out between the steel bushing and the sheave, the steel bushing as shown in each of the figures being in free communication with the oil pocket or reservoir 30. Between the steel bushing pressed in the sheave and the shaft 18 (indicated in dotted lines in Figs. 1 and 2) is a floating bushing 33 preferably of brass or bronze polished both on the inside and the outside and fitting the steel bushing and the shaft loosely with sufficient clearance for a running fit.

A plurality of radial oil holes 34 are provided in the floating bushing to convey oil to the shaft 18 and I find it convenient to position certain of the holes 34 directly in the center line of the sheave while others are slightly to the left and to the right respectively of such center line in order that flow of oil from the annular reservoir 30 and through a hole in a pressed-in bushing will not be interfered with as the floating bushing shifts from side to side within the limits permitted. In each of the modifications shown the floating bushing 33 is substantially similar but the means for centering the floating bushing on the sheave differs with each of the modifications.

Referring particularly to Fig. 2 the steel pressed-in bushing is here shown in two sections numbered 36 and 37 each having at its outside edge an integral annular lip or flange 38 forming a stop member for the floating bushing 33. In this modification the halves of the steel bushing are pressed into the sheave from opposite sides and after assembling a number of radial holes 40 are drilled along the junction line to provide a flow of oil from the reservoir to the floating bushing.

In the modification shown in Fig. 3 the pressed-in steel bushing, here numbered 41, is of one piece slightly shorter axially than the sheave and a ring 42 also of steel is secured to the permanent bushing 41 at each side by means of screws 43 or other fastenings. In this modification the detachable ring 42 takes the place of the flange 48 being of the same size and for the same purpose.

In the modification shown in Fig. 1 which is elected as the preferred form, although I find each of the several modifications of particular suitability under different circumstances, the steel pressed-in bushing, here numbered 45, is of slightly greater axial length than the body of the sheave and is provided at each side with an annular groove 46 into which is snapped a steel split ring 48 the resilience of which is such as to hold the ring firmly seated in the groove when the ends of the ring are released. The purpose of this ring like the flange 38 and the angle member 42 is to limit the axial movement of the floating bushing.

What I claim is:

1. In a casing pulley structure, a stationary shaft, a sheave rotatably mounted thereon, a bushing pressed in said sheave, a floating bushing between said pressed-in bushing and said shaft, and means carried by said pressed-in bushing for limiting axial movement of said floating bushing.

2. In a casing pulley structure, a stationary shaft, a sheave rotatably mounted thereon, a bushing pressed in said sheave, a floating bushing between said pressed-in bushing and said shaft, and detachable means carried by said pressed-in bushing for limiting axial movement of said floating bushing.

3. In a casing pulley structure, a stationary shaft, a sheave rotatably mounted thereon, a bushing pressed in said sheave, a floating bushing between said pressed-in bushing said said shaft, and an annular lip extending inwardly from said pressed-in bushing at each side thereof for positioning said floating bushing.

ALBERT S. JONES.